US006666064B2

(12) United States Patent
LeFavour et al.

(10) Patent No.: US 6,666,064 B2
(45) Date of Patent: Dec. 23, 2003

(54) PORTABLE HYDRAULIC CRIMPING TOOL

(75) Inventors: John D. LeFavour, Litchfield, NH (US); Gordon L. Stelzer, Goffstown, NH (US); Alexander Shlopak, Bethlehem, NH (US); Thomas Faucher, Manchester, NH (US); Christopher G. Chadbourne, Nashua, NH (US); John W. Ayer, Derry, NH (US); Armand T. Montminy, Manchester, NH (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/125,908

(22) Filed: Apr. 19, 2002

(65) Prior Publication Data

US 2003/0196472 A1 Oct. 23, 2003

(51) Int. Cl.7 .......................... B21D 41/04; B23P 11/00; B21J 9/12

(52) U.S. Cl. ................................ 72/453.15; 72/453.16; 72/416; 72/453.03; 72/455; 29/751; 417/415

(58) Field of Search ......................... 72/453.02, 453.03, 72/453.15, 453.16, 416, 455, 456; 29/751; 417/415

(56) References Cited

U.S. PATENT DOCUMENTS

| | | | | | |
|---|---|---|---|---|---|
| 2,696,850 | A | * | 12/1954 | Peterson | 72/453.16 |
| 2,729,063 | A | * | 1/1956 | Hoadley | 72/453.16 |
| 2,821,877 | A | * | 2/1958 | Swanson | 72/453.16 |
| 2,869,407 | A | * | 1/1959 | Swanson | 72/453.16 |
| 3,554,000 | A | * | 1/1971 | Schwab | 72/453.15 |
| 3,786,669 | A | * | 1/1974 | Lines | 72/453.15 |
| 4,226,110 | A | | 10/1980 | Suganuma | 72/416 |
| 4,292,833 | A | | 10/1981 | Lapp | 72/416 |
| 4,339,942 | A | * | 7/1982 | Svensson | 72/416 |
| 4,366,673 | A | | 1/1983 | Lapp | 60/477 |
| 4,796,461 | A | | 1/1989 | Mead | 72/453.16 |
| 4,823,588 | A | * | 4/1989 | Bussereau et al. | 72/453.16 |
| 4,942,757 | A | * | 7/1990 | Pecora | 72/453.16 |
| 4,947,672 | A | * | 8/1990 | Pecora et al. | 72/453.16 |
| 5,062,290 | A | * | 11/1991 | Hoover | 72/416 |
| 5,111,681 | A | | 5/1992 | Yasui et al. | 72/453.03 |
| 5,134,989 | A | | 8/1992 | Akahane | 125/40 |
| 5,195,354 | A | | 3/1993 | Yasui et al. | 72/453.03 |
| 5,442,992 | A | | 8/1995 | Sanner et al. | 91/428 |
| D374,805 | S | | 10/1996 | Moffatt et al. | D8/107 |
| D383,046 | S | | 9/1997 | Moffatt et al. | D8/69 |
| 5,727,417 | A | | 3/1998 | Moffatt et al. | 72/453.03 |
| 5,778,755 | A | | 7/1998 | Boese | 91/399 |

(List continued on next page.)

OTHER PUBLICATIONS

Patent Abstract of Japan—Publication No. 06–198574; Cordless Electric Small–Sized Crimp Tool.

(List continued on next page.)

*Primary Examiner*—David B. Jones
(74) *Attorney, Agent, or Firm*—Harrington & Smith, LLP

(57) ABSTRACT

A hydraulic tool having a frame, and a movable adapter. The frame defines a workspace with an anvil adapter at one end and a substantially flat face guide surface on one side of the workspace. The movable adapter is used for working a piece in the workspace against the anvil adapter. The movable adapter is movably mounted to the frame to move in the workspace relative to the frame along an axis of translation. The movable adapter has a substantially flat face seating surface seated against the guide surface of the frame. When the movable adapter is moved, the seating surface of the movable adapter rides upon the guide surface. The seating surface and guide surface interface with each other for maintaining the movable adapter in a predetermined orientation relative to the frame.

34 Claims, 6 Drawing Sheets

U.S. PATENT DOCUMENTS

| | | | | | |
|---|---|---|---|---|---|
| 5,802,901 | A | | 9/1998 | Oda et al. | 72/161 |
| D408,242 | S | | 4/1999 | Yamamoto | D8/61 |
| 5,924,536 | A | | 7/1999 | Frenken | 192/56.1 |
| 5,934,136 | A | | 8/1999 | Bracher et al. | 72/397 |
| 5,979,215 | A | * | 11/1999 | Lefavour et al. | 72/453.16 |
| 6,044,681 | A | | 4/2000 | Frenken | 72/292 |
| 6,065,326 | A | | 5/2000 | Frenken | 72/453.15 |
| 6,085,422 | A | | 7/2000 | Hirabayashi | 30/122 |
| 6,206,663 | B1 | | 3/2001 | Frenken | 417/549 |
| 6,230,542 | B1 | | 5/2001 | Frenken | 72/456 |
| 6,276,186 | B1 | * | 8/2001 | Frenken | 29/751 |

OTHER PUBLICATIONS

Patent Abstract of Japan—Publication No. 06–262427; Oil Pressure Releasing Mechanism For Power Hydraulic Tool.

Patent Abstract of Japan—Publication No. 08–011066; Hudraulic Crimp Tool.

Patent Abstract of Japan—Publication No. 08–321371; Hydraulic Crimping Device.

Patent Abstract of Japan—Publication No. 09–177707; Hydraulic Circuit For Hydraulic Pump For Double Acting Hydraulic Cylinder.

Patent Abstract of Japan—Publication No. 11–179681; Attachment For Multifunctional Tool.

Patent Abstract of Japan—Publication No. 11–198057; Power Tool.

Patent Abstract of Japan—Publication No. 11–198058; Power Tool.

Patent Abstract of Japan—Publication No. 11–198062; Power Tool.

Patent Abstract of Japan—Publication No. 11–251030; Hydraulic Crimping Tool.

* cited by examiner

PORTABLE HYDRAULIC CRIMPING TOOL

BACKGROUND OF THE INVENTION

1. Field of the Invention

The present invention relates to hydraulic tools and, more particularly, to a compact portable hydraulic tool.

2. Brief Description of Earlier Developments

Hydraulic power tools are used in numerous applications to provide users with a desired mechanical advantage. One such application is in crimping tools used for making crimping connections such as for example crimping power connectors onto conductors. In this case, it is desired that the hydraulic crimping tools be portable in order to bring the tool to the job site. Conventional hydraulic crimping tools are generally heavy and thus cumbersome to handle during operation. The reason for this is that the crimping tools may be subjected to high loads during operation and are provided with structure capable of withstanding such loads. For instance, the movable adapter of a hydraulic crimping tool may often be subjected to considerable non-axial loads (i.e. loads which are not aligned with the axis of travel of the movable adapter in the tool). The non-axial loads on the movable adapter can cause the tool to bind or may even cause failure of the tool during operation. The approach taken to prevent misalignment and binding of the movable adapter under non-axial loads in conventional tools has been to provide the movable adapter and support frame with keying mechanism. However, this results in an increase in the size of both the adapter and support frame of the tool and a corresponding increase in weight. One example of a conventional hydraulic compression tool is shown in U.S. Pat. No. 5,934,136. This tool has a compression head with movable dies each having two guide plates slidably engaging with guide grooves formed into the frame of the compression head.

Another feature desired on hydraulic compression tools is the ability to rapidly advance the movable adapter when closing up gaps between the work piece, such as a crimping connector, and the movable adapter. This allows the user to perform the crimping operation faster, and using a smaller number of pump strokes which is important especially in the case of a manually operated hydraulic crimping tool.

U.S. Pat. Nos. 4,942,757 and 4,947,672, which are hereby incorporated by reference, disclose hydraulic tools with movable rams. FCI USA Inc. sells a hand operated hydraulic tool, type Y750 which has a rapid advance two stage pump and a type Y35 with a rotatable handle for rapid ram advance.

U.S. Pat. No. 5,979,215, which is also incorporated by reference herein in its entirety, discloses a hydraulic tool with an arm and a mechanical actuator in the hydraulic conduit system for contacting a rear end of the ram. Conventional hydraulic crimping tools which have a ram with a rapid advance feature may employ a multi-stage pump or a multi-stage ram piston in order to provide the rapid advance feature. The hydraulic fluid conduit system to route fluid from the multiple stages of the multi-stage pump to the hydraulic fluid contact surface of the ram is complex with numerous parallel conduits between the pump and ram. Accordingly, an extensive amount of machining or fabrication may be involved in forming such a conduit system in the hydraulic tool. The complexity of the hydraulic conduit system has commensurate impact on the time and cost of manufacturing the tool. In the case of a multi-stage ramp piston, the size and length of the ram is increased to accommodate the multiple stages. The longer, larger ram uses a correspondingly longer, larger hydraulic cylinder which in turn increases the size and hence the weight, as well as the cost of the tool. The instant invention overcomes the problems of conventional hydraulic crimping tools as will be described in greater detail below.

SUMMARY OF THE INVENTION

In accordance with the first embodiment of the present invention a hydraulic tool is provided. The hydraulic tool comprises a frame, and a movable adapter. The frame has a work space with an anvil adapter at one end and a substantially flat face guide surface on one side of the workspace. The movable adapter is used for working a piece in the workspace against the anvil adapter. The movable adapter is movably mounted to the frame to move in the workspace relative to the frame along an axis of translation. The movable adapter has a substantially flat face seating surface seated against the guide surface of the frame. When the movable adapter is moved, the seating surface of the movable adapter rides upon the guide surface. The seating surface and guide surface interface with each other in order to maintain the movable adapter in a predetermined orientation relative to the frame.

In accordance with a second embodiment of the present invention, a hydraulic tool is provided. The hydraulic tool comprises a frame, and a movable adapter. The frame has an anvil adapter and a substantially flat guide surface. The movable adapter is movably mounted to the frame to move relative to the frame along an axis of translation. The movable adapter is adapted for working a workpiece in cooperation with the anvil adapter and has a substantially flat support surface seated against the guide surface. The support surface and guide surface interface to prevent rotation of the movable adapter about the axis of translation. The frame includes a bearing surface adapted for maintaining the alignment of the movable adapter with the axis of translation. The bearing surface is disposed in the frame so that the movable adapter does not contact the bearing surface.

In accordance with a third embodiment of the present invention, a hydraulic tool is provided. The hydraulic tool comprises a frame, a ram assembly, and a hydraulic fluid conduit system. The frame has a hydraulic fluid reservoir connected to the frame. The ram assembly is movably mounted to the frame. The ram assembly comprises an outer ram, and an inner ram housed in the outer ram. Both inner and outer rams are movable relative to the frame. The hydraulic fluid conduit system is disposed in the frame between the ram assembly and the fluid reservoir. The outer ram is adapted to be advanced relative to the frame by the inner ram and by hydraulic fluid pressure against the outer ram. The outer ram is advanced by the inner ram pressing against the outer ram when hydraulic fluid pressure in the conduit system is below a predetermined pressure. The outer ram is advanced by hydraulic fluid against the outer ram when hydraulic fluid pressure in the conduit system is above the predetermined pressure.

In accordance with a fourth embodiment of the present invention, a hydraulic tool is provided. The hydraulic tool comprises a frame, a hydraulic fluid conduit system, a ram, and a rapid advance ram actuator. The frame has a hydraulic fluid reservoir connected to the frame. The hydraulic fluid conduit system extends through the frame from the reservoir. The ram is movably mounted to the frame. The ram is adapted to be moved relative to the frame by hydraulic fluid from the conduit system. The rapid advanced ram actuator is movably mounted to the frame for advancing the ram through at least part of the ram travel. The rapid advance ram actuator has one end contacting the ram and another end with an actuator hydraulic fluid contact surface for moving the rapid advance ram actuator relative to the frame using hydraulic fluid from the conduit system. The ram has a chamber formed therein. The rapid advance ram actuator is located inside the chamber in the ram.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
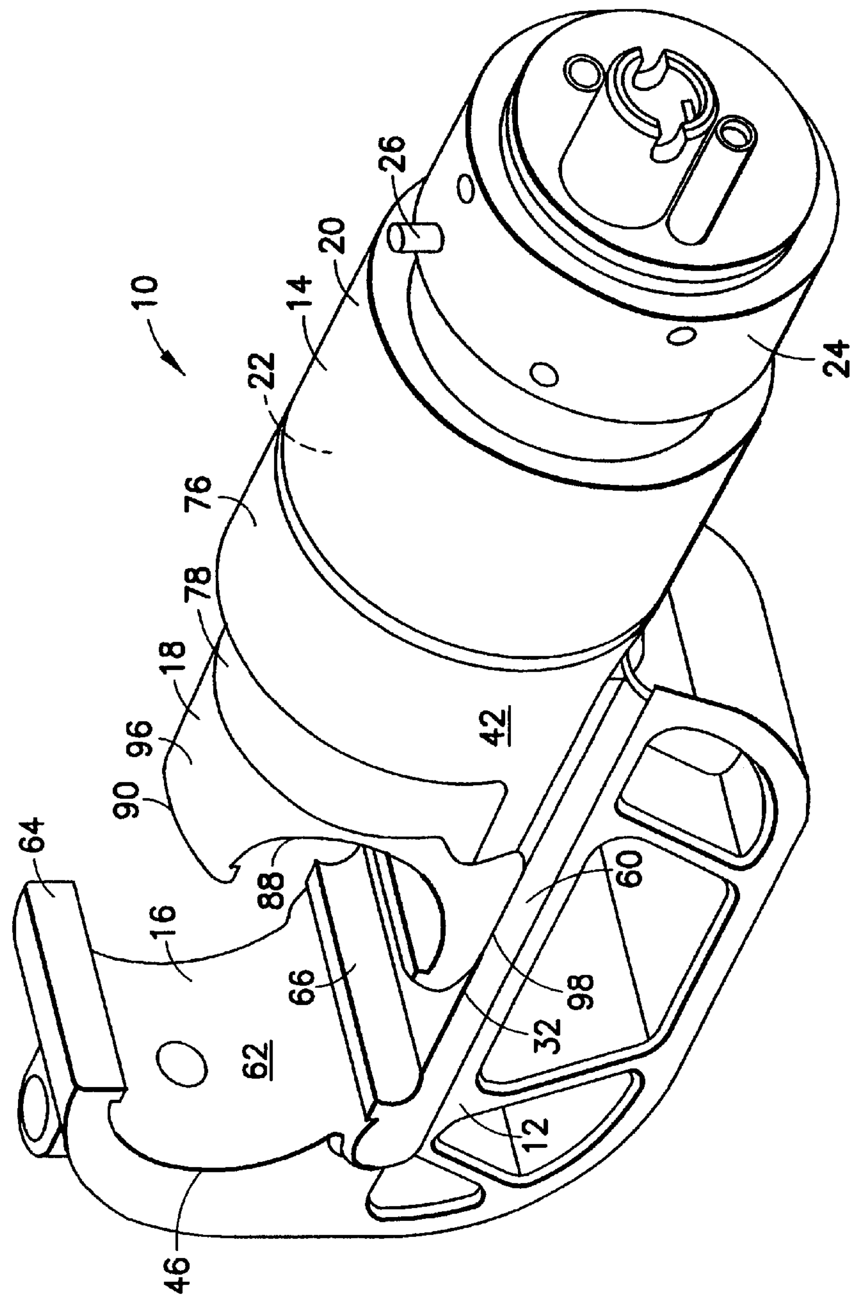
FIG. 1 is a perspective view of a hydraulic crimping tool incorporating features of the present invention.

Referring to FIG. 1, there is shown a perspective view of a hydraulic crimping tool 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
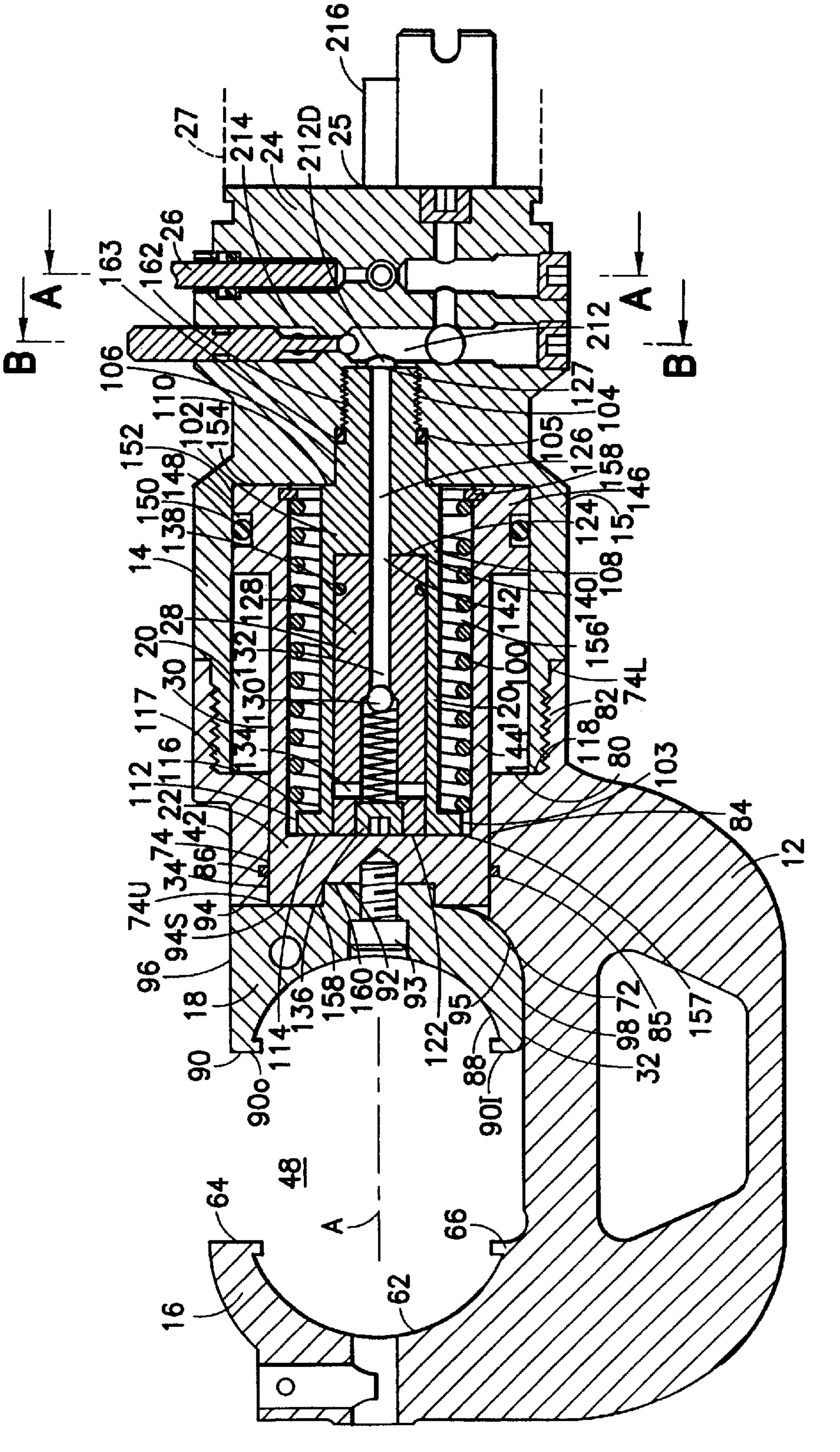
FIG. 2 is a cross-sectional elevation view of the hydraulic crimping tool in FIG. 1.
Figure 2B:
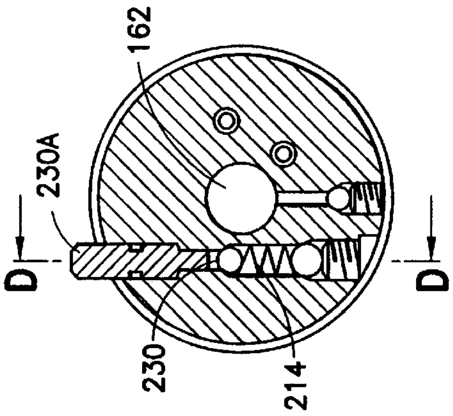
FIGS. 2A–2B are two cross sectional views of a power section and conduit system of the hydraulic crimping tool taken respectively along lines A—A and B—B in FIG. 2.

The present invention is described below with particular reference to a portable crimping tool 10, though the invention is equally applicable to any suitable type of hydraulic power tool. Referring also to FIG. 2, which shows a cross-sectional elevation view of the hydraulic crimping tool 10, the tool generally comprises a head section 12, a power section 14 and a handle (not shown) The head section 12 is connected to the power section 14. The handle section extends from the power section. The head section generally has a static or anvil adapter 16 and movable adapter 18. The anvil adapter 16 is located at one end of the head section. The movable adapter 18 is movably seated in the head section. The power section is a hydraulic power section which generally has a hydraulic cylinder 20, a ram assembly 22, and a pump body 24. The ram assembly 22 is located in the cylinder 20 and is connected to the movable adapter 18 in the head section. The ram assembly 22 has an outer ram 30 and a ram actuator 28. The pump body 24 is connected to the hydraulic cylinder 20. The power section 14 has a pump 26 located in the pump body for pumping hydraulic fluid through the pump body into the hydraulic cylinder. The handle may include a reservoir 27 for hydraulic fluid used in the power section. The handle section may include an actuator (not shown) for actuating the pump 26 in the power section. The actuator may be manually operated such as by using a lever incorporated into the handle. Otherwise, the actuator may be powered by a suitable motor, such as for example, an electromechanical motor. A suitable example of an electromechanical motor and linkage for operating the hydraulic tool pump is provided in U.S. Patent Application entitled "HYDRAULIC COMPRESSION TOOL AND HYDRAULIC COMPRESSION TOOL MOTOR", filed on Apr. 9, 2002 as application Ser. No. 10/119,456, which is incorporated by reference herein in its entirety. When the pump 26 is operated, hydraulic fluid from reservoir 27 is pumped through the pump body 24 to the hydraulic cylinder 20 and the ram assembly 22 therein. The ram actuator 28 of ram assembly 22 is pressed by hydraulic fluid against outer ram 30 thereby advancing the outer ram. The movable adapter 18 connected to the outer ram 30 of the assembly is thus advanced towards the anvil 16. When the movable adapter 18 encounters resistance such as from a work piece between the anvil 16 and movable adapter, hydraulic fluid is sent through the ram actuator 28 to the outer ram 30 thereby again advancing the outer ram and the movable adapter 18 towards the anvil. The movable adapter 18 is guided along a guide surface 32 of head section 12 which prevents the movable adapter 18 from spinning under non-axial loads. The outer ram 30 is seated against a bearing surface 34 of head section 12 to support non-axial loads on the movable adapter 18 as will be described in greater detail below.

Figure 3:
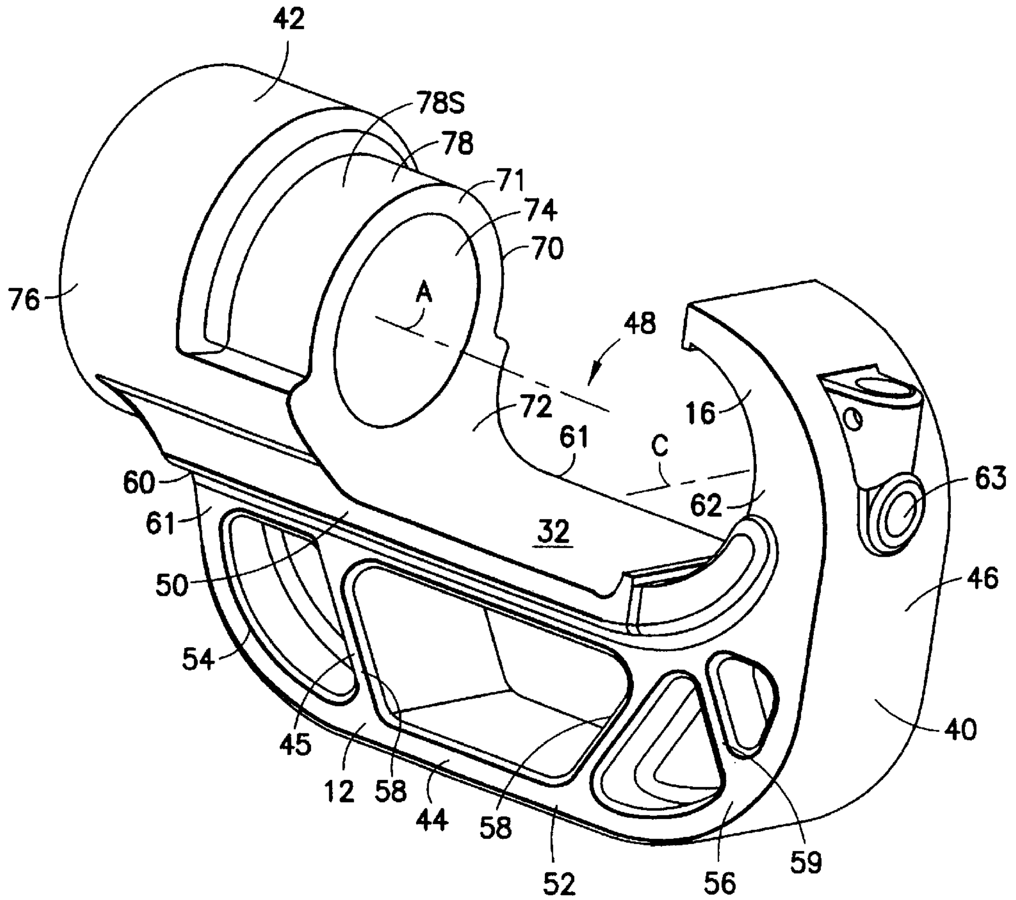
FIG. 3 a perspective view of a section of the frame of the hydraulic crimping tool in FIG. 1.

In greater detail now, as seen best in FIG. 3, in this embodiment, the head section 12 of the tool 10 generally has a base or collar section 42 for connecting the head section to the rest of the tool, and an upper section 44. The upper section 44 may have a general scallop or general C shape, as shown in FIG. 3, which defines a workspace 48 in the head section 12. In alternate embodiments, the head section structure may have any other suitable configuration providing a workspace in which work pieces may be placed into the head section. The upper section 44 depends from the collar section 42. The upper section 44 has a longitudinal portion 45, which forms the back or spine of the C shape, and an upper end 46. The longitudinal portion 45 may be a space frame with inner and outer walls 50, 52 tied to each other by truss supports 58, 59. The truss supports 58, 59 form a series of voids in the longitudinal portion 45 which significantly reduces the weight of the head section 12 without loss in structural strength and rigidity. The outer wall 52 has curved end sections 54, 56 which transition the outer wall into the inner wall 50 at the ends of the longitudinal portion 45. Reinforcing ribs 60 may be formed along the inner wall 50, at both sides 61 of the longitudinal part 45, in order to further increase the rigidity of the head section 12.

The upper end 46 of the head section 12 is cantilevered from the longitudinal portion and has a generally curved shape as is shown in FIG. 3. As can be realized from FIG. 3, the upper end 46 forms the anvil adapter 16 at the top of the workspace 48 in the head section. The anvil adapter has a curved seating surface 62. The curved surface 62 may be of constant radius projected from centerline C (see FIG. 3). As seen in FIGS. 1 and 3, in this embodiment, a bore 63 is formed through the upper end 46 to the seating surface 62 of the anvil adapter 16 for mounting a die (not shown) to the anvil adapter. The curved seating surface 62 may provide a working surface against which work pieces having a round outer surface with a diameter complementing surface 62 may be seated. In the case where the work piece does not have a round outer surface which complements surface 62, a die may be mounted using bore 63 to the anvil adapter allowing the work piece to be stably supported from the anvil adapter. The anvil adapter 16 has outer and inner stop surfaces 64, 66 which stop the travel of the movable adapter 18 in the work space 48 (see FIG. 1). The inner surface 32 of the inner wall 50 of longitudinal portion 45 extends from the inner stop surface 66 of the anvil adapter to the upper edge 70 of the collar section 42. The inner surface 32 is substantially flat as seen in FIG. 3 and provides a guide surface to adapter 18 as will be described below. A radiused transition 72 blends the inner surface 32 into the seating surface 71 along the upper edge 70 of the collar section 42. The inner surface 32 is substantially parallel with the axis of translation A (see FIG. 3) of the movable adapter 18, and the centerline C of the anvil surface 62.

Still referring to FIGS. 1–3, the upper section 44 is integral to the collar section 42. By way of example, the head section 12 may be a one piece member formed by any suitable process such as casting or drop forging. As seen best in FIG. 3, in this embodiment the collar section 42 has a generally cylindrical shape with a cylindrical edge 74 formed therein. In alternate embodiments, the base section of the head section may have any other suitable shape for mating the head section to the power section of the tool. In the preferred embodiment, the cylindrical collar section 42 has a lower part 76 and an upper part 78. As can be seen in FIG. 3, for a major portion of its circumference, the upper part has a smaller exterior diameter than the lower part 76. This results in the exterior of the upper part having a stepped in portion 78S relative to the exterior of the lower part 76. Similar to the exterior of the collar section, the bore 74 also has a lower portion 74L, located in the lower part 76 of the collar, and an upper portion 74U located in the upper part 78. The lower portion 74L has a larger diameter than the upper portion 74U. An annular flange 80, formed by any suitable means, such as machining, in the interior surface of the collar section separates the lower portion 74L from the upper portion 74U (see FIG. 2). The lower portion 74L of the bore is sized to matingly receive the upper end of the power section 14 therein. The inner surface 82 is threaded with suitable internal threads (such NPT series internal threads for example) in order to provide a threaded engagement with the power section 14. The upper portion 74U of the bore is sized to form a close running fit with the ram 30 of the power unit. The inner surface 84 (see FIG. 2) is substantially smooth and forms a bearing surface for ram 30 as will be described in greater detail below. An annular groove 85 is formed into inner surface 84 for a wiper seal 86 or O-ring. As noted before, the collar section 42 ha a seating surface 71 at the upper end 70 for seating the movable adapter 18.

As seen best in FIGS. 1–2, the movable adapter 18 may be a one-piece member which may be cast, forged, or fabricated in any other suitable manner. The movable adapter 18 has an upper or working end 90 which faces towards the anvil adapter 16 at the top of the workspace 48 when the movable adapter is mounted in the head section 12. The upper end 90 of the movable adapter 18 has a working surface 92 which in this embodiment is curved similar but opposite to the curved surface 62 of the anvil. The upper end 90 of the movable adapter also has inner 90I and outer stops 90O to abut respectively against stops 64, 66 of the anvil 16 and stop advance of the movable adapter. The lower end 94 of the movable adapter has a flat seating surface 94S which is seated against surface 71 (see FIG. 3) at the upper end 70 of the collar when the movable adapter is in a retracted position shown in FIG. 2. The movable adapter 18 also has a boss 92 projecting from the surface 94S at the lower end 94. A through hole is provided in the movable adapter 18 for a mounting fastener 93 (such as a machine screw) used to secure the adapter 18 to the ram 30. The through hole may extend through boss 92. The lower end 94 of the adapter 18 also has a rounded inner bottom corner 95 which conforms to radiused transition 72 of the head section 12. As seen in FIGS. 1–2, the body of the movable adapter 18 between the upper and lower ends 90, 94 has an outer surface with a curved or rounded portion 96 and a flat face 98. This configuration provides the adapter 18 with a polarizing feature relative to its installation in head section 12. As can be seen in FIG. 2, the adapter 18 can only be installed into head section 12 with the flat face 98 positioned towards the inner surface 32. The flat face 98 is positioned on the adapter so that when the adapter is fitted to the ram 30, the flat face 98 of the adapter is seated substantially flush against the inner surface 32 of the longitudinal portion 45 of the head section 12. As can be realized from FIGS. 1–2, the interface between the flat inner surface 32 and the flat face 98 of the movable adapter, maintains the movable adapter 18 generally aligned with the anvil 16 and prevents any rotation (about axis A) of the movable adapter 18 as it is advanced by the ram 30 towards the anvil 16.

Referring now again to FIG. 2, the hydraulic power section 14 which is mated to the collar section 42 of the head section 12 has a housing 15 which includes both the hydraulic cylinder 20 and the pump body 24. As noted before, the power section 14 also has ram assembly 22. The ram assembly 22 is movably mounted to the housing 15 as will be described in greater detail below. Ram assembly 22 generally comprises outer ram 30, spring 100, spring holder 102 and rapid advance ram actuator 28. As seen in FIG. 2, the spring holder 102 is an elongated, one-piece member having a generally cylindrical shape. The holder 102 may be made of any suitable corrosion resistant metal such as chromium or nickel alloys. The holder 102 has a retention end 104 (shown as being threaded for example purposes), an intermediate section 106, and a main section 108. The intermediate section 106 is located between the threaded end 104 and main section 108. As seen in FIG. 2, the threaded end 104 has a smaller cross-sectional diameter than intermediate section 106. The threaded end 104 is machined to have an exterior thread of any suitable exterior thread series. The outer surface of the intermediate section 106 is substantially smooth to form a bearing surface for stably holding the spring holder in the housing 15 as will be described in greater detail below. As seen in FIG. 2, in this embodiment, an O-ring groove for O-ring 105 is machined into the exterior of the intermediate section 106. The groove is located adjacent to the threads on the threaded end 104 of the holder 102, though the groove may be located at any other suitable position along the length of the intermediate section. Intermediate section 106 is narrower than the main section 108 of the holder 102. Accordingly, an annular shoulder separates the intermediate section 106 from the main section 108. The annular shoulder forms a seating surface 110 facing toward the threaded end 104 of the holder 102. The main section 108 of the holder 102 terminates in flanged end 103. An external radial flange 112 projects out from the main section at the flanged end. The flange 112 may extend continuously around the circumference of the main section or may be segmented into sections distributed equally around the circumference. The flange 112 has a spring support surface 116 facing the threaded end 104 of the holder and ram seating surface 114 located on the flange opposite the support surface 116 (see FIG. 2). As can be seen in FIG. 2, the main section 108 has a sufficient length so that the spring support surface 116 is located beyond the upper end 118 of the hydraulic cylinder 20 when the spring holder is installed in housing 15. As seen in FIG. 2, the spring holder 102 has a chamber 120 formed therein which is a hydraulic cylinder for the rapid advance actuator 28. The opening 122 of the chamber 120 is located in the flanged end 103 of the holder. The chamber 120 is positioned within the main section 108 of the holder 102 and the bottom 124 of the chamber is located so that rapid advance actuator 28 may be received completely in the chamber 120. The spring holder 102 also has a hydraulic fluid passage 126 which communicates with chamber 120 as seen in FIG. 2. The passage 126 extends from the bottom 124 of the chamber to the entry port 127 at the edge of the threaded end 104.

Still referring to FIG. 2, the spring 100 in the ram assembly 22 may be a helically wound coil spring made from suitable spring wire to provide a desired spring stiffness. The length of the spring 100 is sized to allow the outer ram 30 full range of travel in the hydraulic cylinder 20 without deformation of the spring. The rapid advance ram actuator 28 generally includes an actuator body 128, spring loaded ball valve 130 and set screw 136. The actuator body 128 is preferably a one-piece member made from suitable corrosion resistant metal. The body 128 has a diameter sized to form a close sliding fit within chamber 120 in the spring holder 102. The length of the actuator body 128 is sufficient to advance the outer ram 30 (as will be described in greater detail below) through the full range of ram travel allowed by hydraulic cylinder 20. The exterior of the body 128 may be substantially smooth except for an O-ring groove for O-ring 138 which forms a hydraulic seal between the body 128 and chamber 120 in the spring holder 102. As seen in FIG. 2, the actuator body has a hydraulic fluid passage 132 extending through the body. The passage 132 has an entry port 142 in the hydraulic fluid contact surface 140 of the body. The passage 132 includes an expanded chamber with an appropriate seat for the spring loaded ball valve 130. The passage terminates in a threaded hole for set screw 136 used to set the pressure at which the valve 130 opens. The passage 132 also has outlet ports 134 which open on the exterior of the actuator body 128 above the O-ring 138 as shown in FIG. 2. If desired, the set screw 136 may also have a through bore which when the set screw is installed in the body 128 communicates with passage 132 so that fluid flowing through passage 132 may exit through the set screw 132.

The outer ram 30 is preferably a one-piece member made from suitable corrosion resistant metal. As seen in FIG. 2, the ram 30 has an upper shaft section 144, and an enlarged lower piston section 146. The piston section 146 projects radially outward relative to the shaft section 144. The exterior of the piston section is sized to make sliding contact with the wall of the hydraulic cylinder 20. An O-ring groove 148 is formed into the piston exterior for O-ring 150 which forms a hydraulic seal between the piston 146 and cylinder 20. This provides the piston section 146 with a hydraulic fluid contact surface 152 extending below the O-ring 150. The upper shaft section 144 of ram 30 is sized to form a close sliding fit with the upper portion 74U of the bore in the collar section 4L. The upper end of the shaft section 144 provides a mating surface 158 for mounting movable adapter 18. The mating surface 158 has a recess 160 conforming to boss 92 of the movable adapter (see FIG. 2). A blind threaded hole may be provided into the mating surface 158 for fastener 93. The outer ram 30 has an inner chamber 156 formed therein. The opening of the inner chamber is at the rear end 154 of the ram 30. The length of the inner chamber 156 is sufficient to admit the main section 108 of the spring holder 102 therein when the ram 30 is fully retracted as shown in FIG. 2. As can be realized from FIG. 2, the surface of the chamber 156 is part of the hydraulic fluid contact surface 152 of the ram 30. The ram assembly 22 may be assembled by inserting the rapid advance actuator 28 into the chamber 120 in the spring holder 102. The spring holder 102 may then be placed with the flanged end 103 first into the chamber 156 of the outer arm 30. The spring 100 may be placed into the chamber 156. One end of the spring 100 is seated against support surface 116 of the spring holder 102. With the spring 100 in the chamber 156, retention ring 158 is installed into the chamber to hold the spring 100, and hence, also the spring holder 102 and actuator 28 in the ram 30. As seen in FIG. 2, the ring 158 is installed into a groove in the wall of the chamber 156. The ram assembly may then be installed into the housing 15.

Referring now to FIGS. 2 and 2A–2G, the housing 15 of the power section 14 may be a one-piece member which as noted before includes the hydraulic cylinder 20 and the pump body 24. In alternate embodiments the power section may have a housing assembly comprising a number of housing parts. The upper portion 117 of the housing 15 is configured to mate with the collar section 42 of the tool head section 12. Accordingly, the upper portion 117 of the housing may be machined with external threads complementing internal threads on the interior surface 82 5 of the collar section 42. As seen in FIG. 2, the hydraulic cylinder 20 is located in the upper portion of the housing 15. When mated to the head section 12, the surface of annular flange 80 in the collar section forms the upper end of the cylinder. The length of the cylinder is such that the ram 30 is provided with sufficient travel to advance the movable adapter 18 from the retracted position shown in FIG. 2 to a position (not shown) abutting the stops 64, 66 of the anvil 16. The housing 15 has a bore 162 opening into the bottom of the hydraulic cylinder 20 for mounting the spring holder 102, and hence the ram assembly 22 into the housing. The bottom part of the bore 162 is threaded to complement the threaded end 104 of the spring holder. The upper part 163 of the bore 162 conforms closely to the exterior of intermediate section 106 of the spring holder. The O-ring 105 on the holder 102 forms a hydraulic seal in bore 162 preventing hydraulic leaks between the hydraulic cylinder 20 and pump body 24 around the spring holder 102.

Figure 2D:
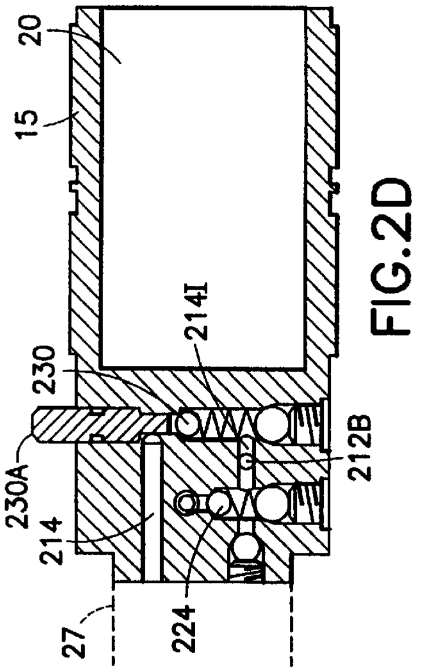
FIGS. 2C–2E are other cross sectional views of the power section taken respectively along lines C—C, D—D, and E—E.
Figure 2A:
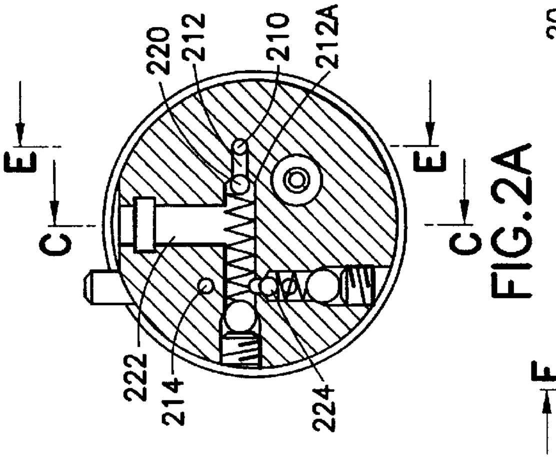
Figure 2C:
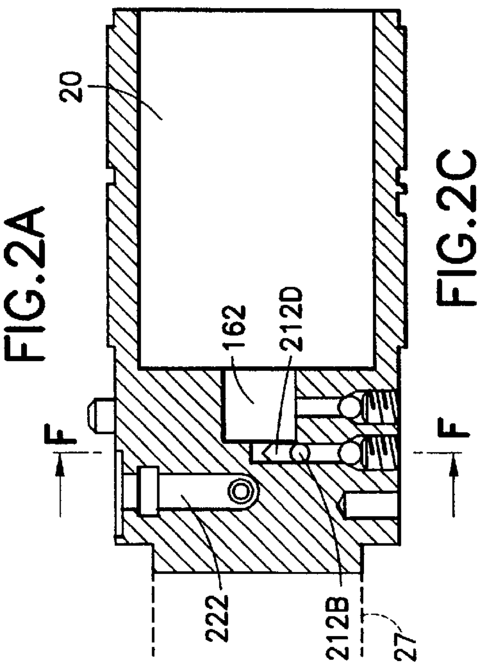
Figures 2E, 2F, 2G:
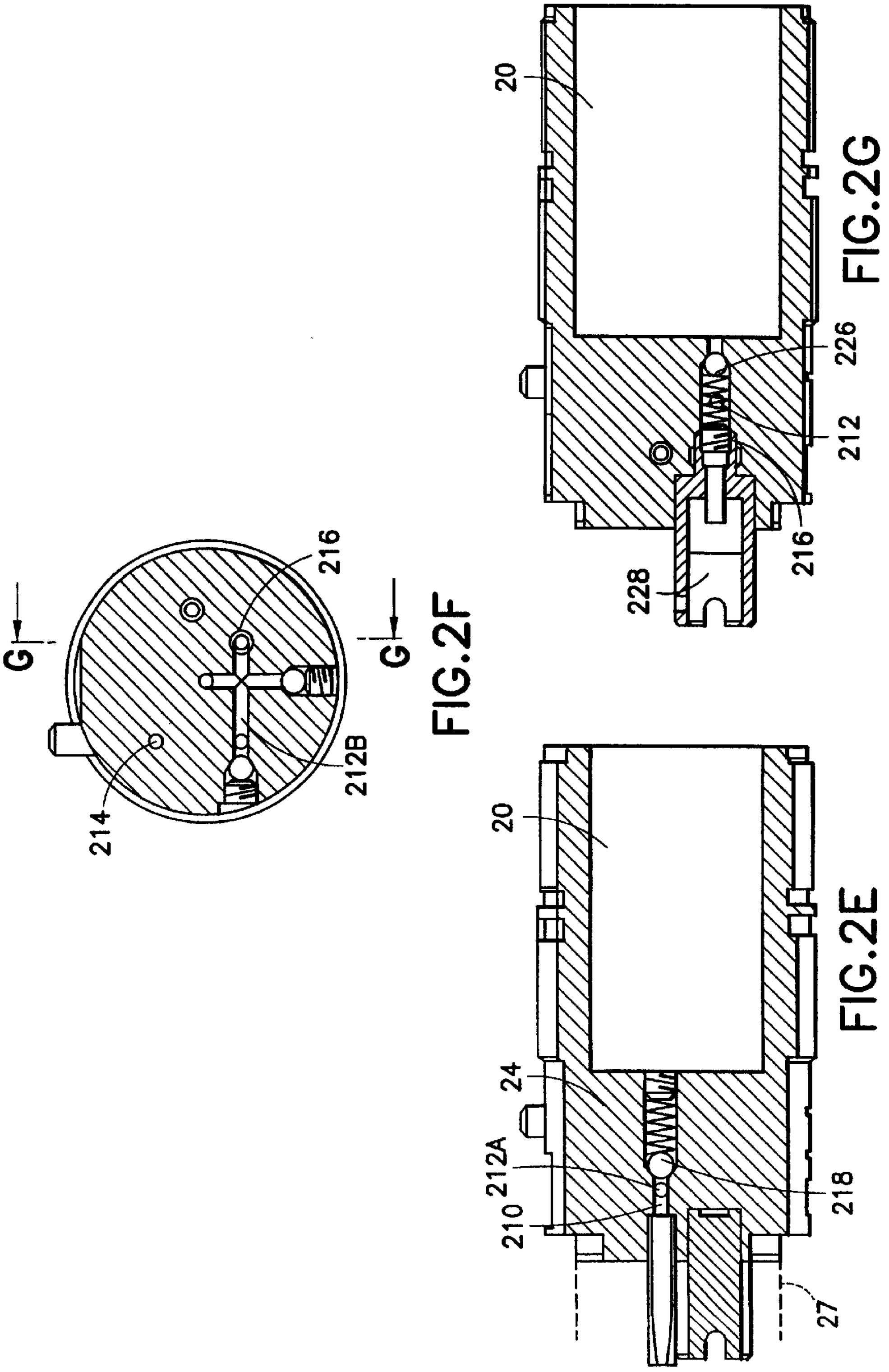
FIGS. 2F–2G are still other cross sectional views of the power section respectively taken along lines F—F in FIG. 2C, and lines G—G in FIG. 2F.

The pump body 24 of housing 15 includes a hydraulic fluid conduit system 25 connecting the hydraulic cylinder 20 to the fluid reservoir 27. The pump 26 is located in the conduit system 25. The pump 26 is a one stage pump, and the preferred embodiment will be described below with specific reference to the one stage pump, although multistage pumps may be used equally well with the present invention. The conduit system 25 preferably has one suction conduit 210 and one supply conduit 212. The conduit system 25 has a primary drain or return conduit 214 and a secondary drain conduit 216. As seen in FIG. 2E, the suction conduit 210 extends directly between the reservoir 27 and the hydraulic chamber 20. The suction conduit 210 has a check valve 218 which is closed by fluid pressure in the hydraulic cylinder. FIGS. 2A and 2E show that the supply conduit 212 with a portion 212A which communicates with suction conduit 210 at a T-junction. As seen in FIG. 2A, immediately downstream of the junction to suction conduit 210, the supply conduit portion 212A has a check valve 220. Check valve 220 is closed when fluid pressure in the supply conduit portion 212A is greater than pressure in the suction conduit 210. The supply conduit has pump chamber 222 for pump 26. The pump chamber 222, and hence pump 26, is located in portion 212A between check valve 220 and check valve 224. As can be realized, check valve 220 isolates the supply conduit portion 212A from the suction conduit 210 when the pump 26 is depressed into chamber 222 and pumps fluid through the supply conduit 212. Check valve 224 closes the supply conduit portion 212A (preventing reverse flow) when the pump 26 is raised in chamber 222 causing suction in the supply conduit. Downstream of valve 224, is the supply conduit portion 212B is routed to discharge port 212D in the bottom of bore 162 which is located at the bottom of hydraulic cylinder 20 (see FIGS. 2B and 2D). The supply conduit portion 212B is also joined to both primary and secondary drain conduits 214, 216 (see FIGS. 2D, 2F and 2G). As seen in FIG. 2G, secondary drain conduit 216 extends directly between the bottom of the hydraulic chamber 20 and the reservoir. The conduit 216 has a check valve 226 which is closed when fluid from the supply conduit 212 pressurizes the drain conduit 216 downstream of the check valve. In alternate embodiments, the check valve may be positioned to isolate the drain conduit from the supply conduit by pressure in the hydraulic chamber. The secondary drain conduit 216 may also include a pressure sensing solenoid valve 228 which opens to drain the supply conduit portion 212 when an over pressure is sensed in the supply conduit or hydraulic chamber. The primary drain conduit 214 is connected by section 214I to the supply conduit portion 212B as shown in FIG. 2D. The primary drain conduit 214 thus communicates with bore 162 through the downstream section of the supply conduit 212. The primary drain conduit 214 drains into reservoir 27. The drain conduit 214 includes a plunger actuated valve 230 which isolates the junction 214I to the supply conduit 212 from the reservoir 27.

Referring again to FIG. 2, the ram assembly 22 may be installed into housing 15 by threading the threaded end 104 of the spring holder 102 into the threaded part of bore 162. Compression spring 100 may generate sufficient friction between the outer ram 30 and spring holder 102 to allow the holder to be threaded by merely turning the outer ram. Otherwise, the outer ram and spring holder may be provided with radially interlocking features for turning the spring holder from the outer ram while allowing the ram to slide axially relative to the spring holder. When the spring holder is installed to the housing 15, surface 116 of the flange 112 on the holder 102 presses against spring 100. Thus, the spring 100 is compressed against ring 158 thereby biasing the outer ram 30 against surface 114 of the holder 102 (see FIG. 2). End surface 122 of the rapid advance actuator 28 is substantially flush or otherwise projecting slightly beyond the spring holder 102 and hence is also in contact with the top 157 of the chamber 156 in the outer ram. The O-ring 150 on the ram 30 forms a hydraulic seal with hydraulic chamber 20. The O-ring 105 seals between the spring holder 102 and bore 162. Passage 126 in the holder 102, and hence passage 132 in the ram actuator 28 communicate with the discharge port 212D of supply conduit 212. As can be realized from FIG. 2, the O-ring 105 isolates the discharge port 212D of the supply conduit 212 from the hydraulic chamber. Hydraulic fluid pumped through the supply conduit 212 must enter passage 126 in the spring holder 102.

After installation of the ram assembly 22 into housing 15, the head section is mounted by threading collar section 42 onto the upper portion 117 of the housing. As seen in FIG. 2, the upper end of the ram shaft 144 extends through the bore 74 in the collar section. The ram shaft 144 is thus seated on bearing surface 34 of the collar section 42. The movable adapter 18 is installed in the head section 12 as shown in FIG. 2, and connected to the outer ram 30 by inserting fastener 93. The threaded interface between head section 12 and housing 15, and between the movable adapter 18 and ram 30, allow the head section and movable adapter to swivel about axis A relative to the housing 15 and ram 30. When the head section 12 is rotated about axis A, the head section rotates around outer ram 30. Outer ram 30 does not rotate relative to housing 15. Thus, when the head section is rotated about axis A, sliding contact may occur between the ram shaft 144 and collar section 42 and not between the piston section 146 of the ram 30 and the hydraulic cylinder 20. This avoids damage to the smooth surfaces of the ram's piston section 146 and the hydraulic cylinder 20 when the head section is swiveled on the housing 15. Thus, the head section 12 of the tool 10 may be swiveled as many times as desired in order to properly position work pieces (not shown) relative to the adapters 16, 18 without having to reposition the entire tool in order to avoid spinning the ram piston surface inside the hydraulic cylinder surface which may result in damage to both.

The tool 10 is operated by actuating the pump 26 (either manually or with a suitable motor). The pump 26 is primed by moving the pump outward in chamber 222 which draws fluid through valve 220 from the suction conduit 210 (and reservoir 27) into the supply conduit 210. Pressing the pump 26 inwards into chamber 222 displaces the fluid downstream through valve 224 (valve 220 is closed by the pumping pressure) and supply conduit 212 and out of discharge port 212D (see FIGS. 2A, 2C, 2D). Discharge valve 230 is shut preventing fluid from being pumped from the supply conduit to the drain conduit 214. Check valve 226 (see FIG. 2G) is shut by the pressure in the supply conduit 212 preventing fluid from being pumped directly into the hydraulic cylinder 20. From discharge port 212D the fluid enters passage 126 in the spring holder 102. Passage 126 directs the hydraulic fluid into chamber 120 against the hydraulic fluid contact surface 140 of the rapid advance ram actuator 28. Fluid also enters passage 132 in the actuator 28 but is prevented from flowing further by check valve 130 which is shut. The pumping action of pump 26 thus feeds fluid under pressure into chamber 120 pressing against actuator 28 which in turn presses against the outer ram 30. The actuator 28 is advanced along axis A relative to the spring holder by the fluid pumped chamber 120. The actuator 28 in turn advances the outer ram 30 and the movable adapter 18 relative to the head section 12. As noted before, the pressure set point for opening valve 130 is larger than the pressure used in chamber 120 to advance the ram 30 with actuator 28 when there is little to no resistance forces exerted against the movable die 18 in the workspace 48 (i.e. the movable die 18 is unloaded). When the movable die 18 encounters resistance, the pumping action of pump 26 causes the pressure in the chamber 120 and hence passage 132 to rise and open the valve 130. This allows fluid to flow through the ram actuator 28 and discharge from ports 134 as well as any bores (not shown) in set screw 136. The hydraulic fluid then enters into chamber 156 of the outer ram 30 and thus into the hydraulic cylinder 20. The significantly larger area of the portion of the hydraulic fluid contact surface 154 normal to axis A (i.e. the piston face) causes the ram 30 to advance readily even against high resistance forces with little further increase in pressure although the pump 26 may be capable of generating any desired pressure in hydraulic chamber 20. As can be realized from FIG. 2, the face area ratio between the pump 26 and ram actuator 28 is much smaller than the face area ratio between the pump 26 and outer ram 30. Hence, for a given pump stroke of pump 26, the ram actuator 28 (with valve 130 closed) will advance ram 30 a larger distance along axis A than when the ram 30 is advanced by pressure in the hydraulic cylinder alone. By way of example, for a pump having a 0.25 inch diameter, a ram with a piston face diameter of 2.0 inches, and a ram actuator face diameter of 0.3 inch, the actuator to pump face area ratio is about 1.44 and the ram to pump face area ratio is about 64. Hence, for a pump stroke of an 1.0 inch it takes about 1.4 pump strokes to advance the actuator 28, and hence ram 30, about 1.0 inch. It takes about 64 pump strokes to advance the outer ram 30 1.0 inch without using the actuator 28. In other words, when the ram is not under load, and valve 130 is closed, the ram 30 is advanced by rapid advance ram actuator 28 at a rate 44 times faster for a given pump stroke then when the ram 30 is loaded and valve 130 is open. Moreover, the interior placement of the ram actuator 28 inside the outer ram 30 allows the size of housing 15 to be reduced with a corresponding reduction in the weight of the housing and of the tool 10 as a whole. Machining of the housing 15 is also simplified because the chamber 120 for the ram actuator 28 is machined into the spring holder 102, not the housing 15. The spring holder 102 is smaller and lighter than the housing 15, allowing the holder to be handled easier than the housing during machining. The outer shape of the holder 102 also allows the chamber 120 to be machined more precisely in the holder than in the housing.

As noted before, advance of ram 30 moves the movable adapter 18 along axis A towards anvil adapter 16. Flat face 98 of the adapter 18 rides over surface 32 of the head section 12. As can be realized from FIGS. 1 and 2, as the movable adapter 18 encounters eccentric loads which tend to rotate the movable adapter 18 about axis A, the flat faces 98, 32 respectively on the adapter 18 and head section 12 interact (generate a moment couple) to resist rotation of the movable adapter. Other eccentric loads tending to displace the movable adapter 18 in directions orthogonal to axis A are transferred as shear loads through boss 92 to the ram shaft 144 which is seated against large bearing surface 34 in the head section collar 42. Thus, eccentric loads on the movable adapter are prevented from binding or damaging the tool 10 during operation. Return of the movable adapter to the position shown in FIG. 2 is achieved by pressing the plunger actuator 230A to open drain valve 230. As can be realized from FIGS. 2C, 2D and 2G, when valve 230 is opened fluid pressure in supply conduit 212 causes fluid to flow through section 214I into the primary drain conduit 214 to reservoir 27. Fluid under pressure also flows out of chamber 120 (valve 130 in the actuator 28 shuts as pressure in the supply conduit drops when drain valve 230 is opened) through passage 126 (see FIG. 2) back into the supply conduit and as noted above into the drain conduit 214. As chamber 120 becomes evacuated of fluid, the ram actuator 28 is returned into the chamber 120 with the low pressure in the supply conduit 212, pressure in the hydraulic cylinder 20 becomes sufficient to open check valve 226 in drain conduit 216. When valve 226 is open, fluid flows out from the hydraulic cylinder 20, allowing the ram to return into the cylinder, through conduit 216 to supply conduit 212 (see FIGS. 2F, 2G) and then through drain conduit 214 as previously described to reservoir 27.

As has been described above, the seating surface 32, 98 on the head section and movable adapter 18, the bearing surface 34 within the head section, the incorporation of the rapid advance ram actuator within the ram assembly 22, are just some of the many features resulting in a hydraulic tool 10 with a two speed arm that can be rapidly advanced under no load, while the tool itself is very compact, and hence light and easy to use. The conduit system which is machined into the pump body 24 of the tool has a small number of conduits which simplifies manufacture of the pump body with a commensurate reduction in the time and expense of fabricating the tool.

Figure 4:
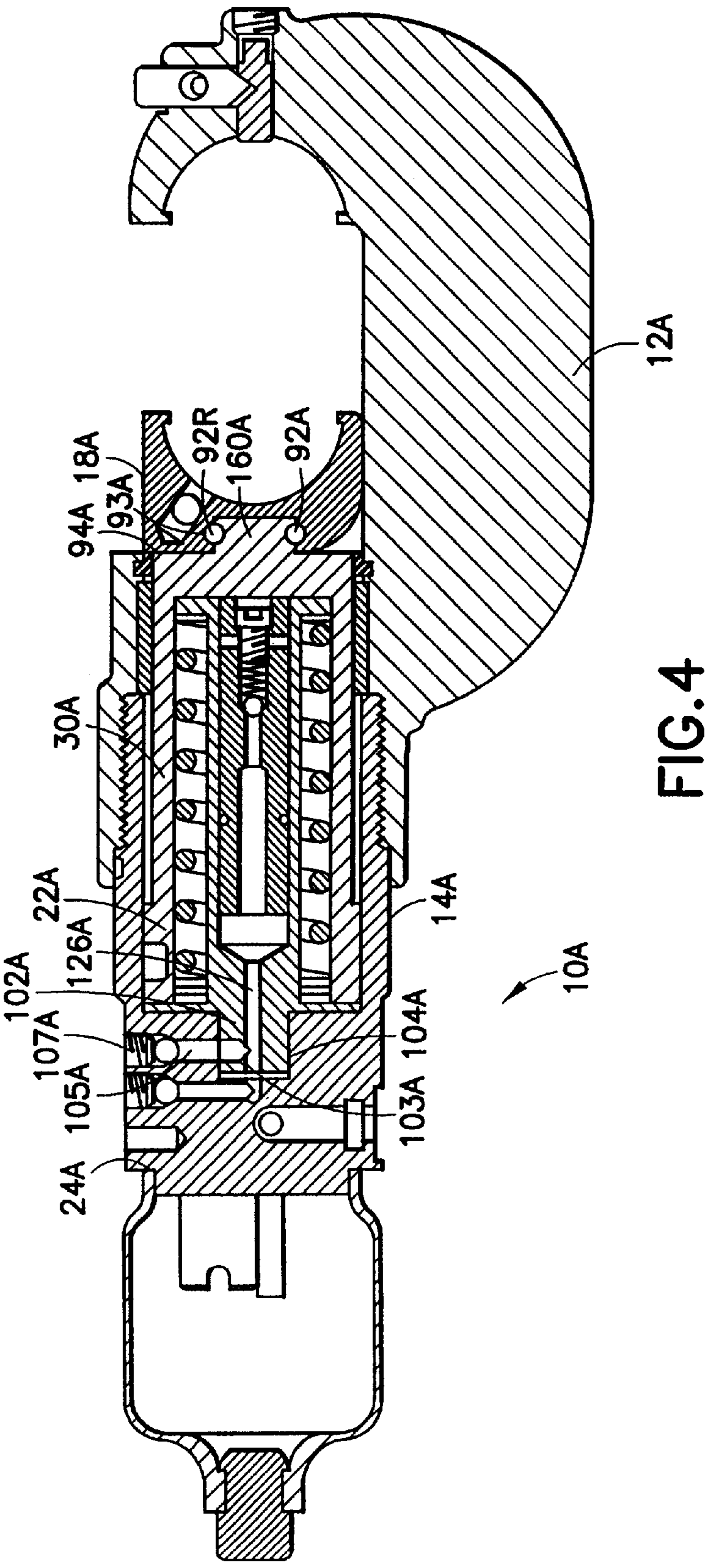
FIG. 4 is a cross-sectional view of a hydraulic crimping tool in accordance with another embodiment of the present invention.

Referring now to FIG. 4, there is shown a cross-sectional view of another embodiment. The tool 10A in FIG. 4 is similar to tool 10 shown in FIGS. 1–3 and described above, and similar items are similarly numbered. As seen in FIG. 4, the movable adapter 18A in the head section 12A is joined to the ram 30A by other means than those used in tool 10 in FIG. 7. The connection of the movable adapter 18A to the ram 30 is another example of a suitable joint between the adapter and ram which allows the movable adapter 18A to remain rotationally fixed to the head section 112A while allowing the adapter 18A and the head section 12A to rotate relative to ram 30A. In the embodiment shown in FIG. 4, the movable adapter 18A has a bore 92A formed into seating surface 74A. The bore 92A may have an annular groove 92R for ball bearings 93A. In alternate embodiments, the inside of the bore may be smooth. Conversely, the end of the ram 30A facing the movable adapter has a post or boss 160A sized to form a close running fit inside bore 92A. The boss 160A on the end of the ram also has a series of annular scallops or pockets for seating ball bearings 93A. In alternate embodiments, no ball bearings may be used. The movable adapter may have a passage (not shown) extending radially outward from groove 92R through which bearings 93A may be introduced into the groove. As the bearings 93A are introduced into groove 92R, the adapter 18A may be rotated relative to ram 30A (by rotating the head section 12A for example) such that the bearings 93A are individually seated into the pockets on boss 160A. As can be seen in FIG. 4, the bearings 93A allow the adapter 18A and hence the head section 12A of the tool 10A to rotate freely relative to ram 30A which may remain fixed in the power section 14A.

Still referring to FIG. 4, in this embodiment the ram assembly 22A in the power section 14A has a spring holder 102A with a retention end 104A. In this embodiment, the retention end 104A is not threaded. Retention end 104*a* may be cylindrical or may have any other suitable shape such as square or rectangular. As seen in FIG. 4, the retention end 104A may have a recess 103A for a lock pin (not shown) which extends laterally from the exterior into the retention end 104A of the spring holder 102A. The recess 103A may be blind and may not communicate with the hydraulic fluid passage 126A in the spring holder 102A. The pump body 24A of the power section 14A may have a chamber 105A drilled or otherwise formed therein for the lock pin (not shown) used to lock the spring holder 102A, and hence (as described before) the ram assembly 22A in the power section 14A. The lock pin chamber 105A may be plugged with a set screw 107A after the lock pin (not shown) is inserted into the chamber 105A and recess 103A in the spring holder 102A. In alternate embodiments, the ram assembly may be operably held in the power section using any other suitable means.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hydraulic tool comprising:

a one-piece frame member defining a work space with an anvil adapter at one end and a substantially flat face guide surface on one side of the work space, wherein the guide surface extends along a majority of length of the work space on the side, and wherein the guide surface is flat along an entire width of the side along the majority of length of the side; and a movable adapter for working a piece in the work space against the anvil adapter, the movable adapter being movably mounted to the frame to move in the work space relative to the frame along an axis of translation, the movable adapter having a substantially flat face seating surface seated against the guide surface of the frame;

wherein, when the movable adapter is moved, the seating surface of the movable adapter rides upon the guide surface, the seating surface and guide surface interfacing with each other for maintaining the movable adapter in a predetermined orientation relative to the frame.

2. The tool according to claim 1, wherein the tool is portable.

3. The tool according to claim 1, further comprising a ram movably mounted to the frame for moving the movable adapter, and a rapid advance actuator movably mounted to the ram for advancing the ram at two rates of advance.

4. The tool according to claim 3, further comprising a hydraulic fluid conduit system disposed in the frame to conduit hydraulic fluid from a hydraulic fluid reservoir to the ram, the ram having a hydraulic fluid contact surface with a chamber formed therein.

5. The tool according to claim 4, wherein the rapid advance actuator is located inside the chamber.

6. The tool according to claim 4, further comprising a spring connected to the frame for biasing the ram opposite to an advance direction of the ram, and a spring holder mounted to the frame for supporting the spring in the frame.

7. A hydraulic tool comprising:

a frame defining a work space with an anvil adapter at one end and a substantially flat face guide surface on one side of the work space;

a movable adapter for working a piece in the work space against the anvil adapter, the movable adapter being movably mounted to the frame to move in the work space relative to the frame along an axis of translation, the movable adapter having a substantially flat face seating surface seated against the guide surface of the frame;

a ram movably mounted to the frame for moving the movable adapter;

a rapid advance actuator for advancing the ram at two rates of advance;

a hydraulic fluid conduit system disposed in the frame to conduit hydraulic fluid from a hydraulic fluid reservoir to the ram, the ram having a hydraulic fluid contact surface with a chamber formed therein;

a spring connected to the frame for biasing the ram opposite to an advance direction of the ram; and a spring holder mounted to the frame for supporting the spring in the frame, wherein, when the movable adapter is moved, the seating surface of the movable adapter rides upon the guide surface, the seating surface and guide surface interfacing with each other for maintaining the movable adapter in a predetermined orientation relative to the frame, wherein the spring holder supports the spring inside the chamber in the ram, and wherein the spring holder has an actuator hydraulic cylinder formed therein for the rapid advance actuator.

8. The tool according to claim 7, wherein the spring holder has a hydraulic fluid passage connecting the actuator hydraulic cylinder to the hydraulic fluid conduit system in the frame.

9. The tool according to claim 3, wherein the rapid advance actuator has one end contacting the ram and another end with a hydraulic fluid contact surface.

10. The tool according to claim 3, wherein the rapid advance actuator has a hydraulic fluid passage formed therein for directing hydraulic fluid through the rapid advance actuator to a hydraulic fluid contact surface of the ram.

11. A hydraulic tool comprising:

a frame comprising a one-piece frame member having an anvil adapter and a substantially flat guide surface; and a movable adapter movably mounted to the frame to move relative to the frame along an axis of translation, the movable adapter being adapted for working a workpiece in cooperation with the anvil adapter and having a substantially flat support surface seated against the guide surface;

wherein the support surface and guide surface interface to prevent rotation of the movable adapter about the axis of translation relative to the frame, and wherein the one-piece frame member includes a bearing surface adapted for maintaining alignment of the movable adapter with the axis of translation, the bearing surface being disposed on an inside surface of the one-piece frame member so that the movable adapter does not contact the bearing surface.

12. The tool according to claim 11, wherein the frame includes a collar with a bore for a ram to pass through the collar and move the movable adapter, an inner surface of the bore defines the bearing surface of the frame.

13. The tool according to claim 11, wherein the tool is portable.

14. The tool according to claim 11, further comprising a hydraulic power section connected to the frame.

15. The tool according to claim 14, wherein the hydraulic power section has a ram operably connected to the movable adapter for moving the adapter relative to the frame, the ram being seated at least in part against the bearing surface of the frame.

16. The tool according to claim 15, wherein the hydraulic power section has a rapid advance actuator for advancing the ram relative to the frame at two different rates of advance.

17. The tool according to claim 16, wherein the rapid advance actuator is housed in the ram.

18. The tool according to claim 15, wherein the frame is free to rotate about the axis of translation relative to the ram.

19. A hydraulic tool comprising:

a frame with a hydraulic fluid reservoir connected to the frame;

a ram assembly movably mounted to the frame, the ram assembly comprising an outer ram and an inner ram housed in the outer ram, both inner and outer rams being movable relative to the frame and each other; and a hydraulic fluid conduit system disposed in the frame between the ram assembly and the fluid reservoir;

wherein the outer ram is adapted to be advanced relative to the frame by the inner ram and by hydraulic fluid pressure against the outer ram, the outer ram being advanced by the inner ram pressing against the outer ram when hydraulic fluid pressure in the conduit system is below a predetermined pressure, and the outer ram being advanced by hydraulic fluid pressure against the outer ram when hydraulic fluid pressure in the conduit system is above the predetermined pressure.

20. The tool according to claim 19, wherein the outer ram of the ram assembly has two different rates of advancement for a given pump stroke.

21. The tool according to claim 20, wherein when the outer ram is advanced by the inner ram, the outer ram advances at a higher rate of advance then when the outer ram advances under hydraulic fluid pressure.

22. The tool according to claim 20, wherein the inner ram includes a hydraulic fluid passage which is in communication with the conduit system allowing hydraulic fluid from the conduit system to flow through the inner ram.

23. A hydraulic tool comprising:

a frame with a hydraulic fluid reservoir connected to the frame;

a ram assembly movably mounted to the frame, the ram assembly comprising an outer ram and an inner ram housed in the outer ram, both inner and outer rams being movable relative to the frame; and a hydraulic fluid conduit system disposed in the frame between the ram assembly and the fluid reservoir;

wherein the outer ram is adapted to be advanced relative to the frame by the inner ram and by hydraulic fluid pressure against the outer ram, the outer ram being advanced by the inner ram pressing against the outer ram when hydraulic fluid pressure in the conduit system is below a predetermined pressure, and the outer ram being advanced by hydraulic fluid pressure against the outer ram when hydraulic fluid pressure in the conduit system is above the predetermined pressure, wherein the inner ram includes a hydraulic fluid passage which is in communication with the conduit system allowing hydraulic fluid from the conduit system to flow through the inner ram, and wherein the inner ram has a valve in the hydraulic fluid passage, the valve being adapted to be closed when hydraulic fluid pressure in the conduit system is below the predetermined amount, and to be open when hydraulic fluid pressure in the conduit system is above the predetermined amount.

24. The tool according to claim 22, wherein the hydraulic fluid passage in the inner ram has an outlet, hydraulic fluid flowing from the conduit system through the inner ram being discharged from the outlet to contact a hydraulic fluid contact surface of the outer ram.

25. A hydraulic tool comprising:

a frame with a hydraulic fluid reservoir connected to the frame;

a ram assembly movably mounted to the frame, the ram assembly comprising an outer ram and an inner ram housed in the outer ram, both inner and outer rams being movable relative to the frame; and a hydraulic fluid conduit system disposed in the frame between the ram assembly and the fluid reservoir;

wherein the outer ram is adapted to be advanced relative to the frame by the inner ram and by hydraulic fluid pressure against the outer ram, the outer ram being advanced by the inner ram pressing against the outer ram when hydraulic fluid pressure in the conduit system is below a predetermined pressure, and the outer ram being advanced by hydraulic fluid pressure against the outer ram when hydraulic fluid pressure in the conduit system is above the predetermined pressure, wherein the ram assembly further comprises a spring disposed between the outer ram and inner ram, the spring biasing the outer ram in a direction opposite to an advance direction of the outer ram.

26. The tool according to claim 25, wherein further comprising a spring holder mounted to the frame for supporting the spring in the ram assembly, the spring holder having another hydraulic fluid passage communicating with the hydraulic fluid conduit system, and a hydraulic cylinder for the inner ram.

27. The tool according to claim 26, wherein the outer ram has a hydraulic fluid contact surface with a chamber formed therein, and wherein the spring holder extends through one end of the outer ram into the chamber.

28. A hydraulic tool comprising:

a frame with a hydraulic fluid reservoir connected to the frame;

a hydraulic fluid conduit system extending through the frame from the reservoir;

a ram movably mounted to the frame, the ram being adapted to be moved relative to the frame by hydraulic fluid from the conduit system; and a rapid advance ram actuator movably mounted to the frame for advancing the ram through at least part of a ram travel, the rapid advance ram actuator having one end contacting the ram and another end with an actuator hydraulic fluid contact surface for moving the rapid advance ram actuator relative to the frame using hydraulic fluid from the conduit system;

wherein the ram has a chamber formed therein, and the rapid advance ram actuator is located inside the chamber.

29. The tool according to claim 28, wherein the ram has a ram hydraulic fluid contact surface for contacting hydraulic fluid from the conduit system, and the rapid advance ram actuator contacts the ram hydraulic fluid contact surface.

30. The tool according to claim 28, further comprising a pump located in the hydraulic fluid conduit system, wherein the frame has a hydraulic cylinder for the ram, and the hydraulic fluid conduit system has only one supply conduit communicating with the hydraulic cylinder for transporting hydraulic fluid from the pump into the hydraulic cylinder, and has only one suction conduit communicating with the hydraulic cylinder for transporting fluid into the hydraulic cylinder when the rapid advance ram actuator advances the ram.

31. A hydraulic crimping tool comprising:

a head section;

a movable adapter movably connected to the head section to move relative to the head section along an axis of translation, the movable adapter interfacing with the head section so that the adapter is held in a predetermined orientation relative to the head section when the movable adapter is moved along the axis of translation; and a hydraulic power section with a hydraulic ram connected to the movable adapter to move the adapter along the axis of translation;

wherein at least one of the ram or movable adapter has a boss mated to a socket to couple the movable adapter and ram, wherein the boss has a circumferential groove for holding locking means locking the movable adapter to the ram while allowing the head section to rotate freely relative to the ram, wherein the locking means comprise ball bearings, the ball bearings being located in the circumferential groove, the movable adapter being seated on the ball bearings so that the adapter is free to rotate relative to the ram.

32. The tool according to claim 31, wherein the socket has an annular groove located opposite the circumferential groove in the boss.

33. The tool according to claim 31, wherein the boss depends from an end of the ram facing the movable adapter.

34. The tool according to claim 31, wherein the socket is formed into an end of the movable adapter.

* * * * *

UNITED STATES PATENT AND TRADEMARK OFFICE

CERTIFICATE OF CORRECTION

PATENT NO. : 6,666,064 B2

DATED : December 23, 2003

INVENTOR(S) : John D. LeFavour et al.

It is certified that error appears in the above-identified patent and that said Letters Patent is hereby corrected as shown below:

Title page,

Item [75], Inventors, please delete "Stelzer" and replace with -- Steltzer --.

Signed and Sealed this

Sixteenth Day of March, 2004

JON W. DUDAS

*Acting Director of the United States Patent and Trademark Office*